United States Patent
Miller et al.

(10) Patent No.: US 11,993,946 B2
(45) Date of Patent: May 28, 2024

(54) DAVIT ARM BASE

(71) Applicants: Adam John Miller, Cranbourne (AU); Robert Leslie Miller, Cranbourne (AU)

(72) Inventors: Adam John Miller, Cranbourne (AU); Robert Leslie Miller, Cranbourne (AU); Andrew Glover, Cranbourne (AU)

(73) Assignees: Adam Miller, Cranbourne (AU); Robert Miller, Cranbourne (AU)

(*) Notice: Subject to any disclaimer, the term of this patent is extended or adjusted under 35 U.S.C. 154(b) by 312 days.

(21) Appl. No.: 17/604,099

(22) PCT Filed: Apr. 16, 2020

(86) PCT No.: PCT/AU2020/000033
§ 371 (c)(1),
(2) Date: Oct. 15, 2021

(87) PCT Pub. No.: WO2020/210858
PCT Pub. Date: Oct. 22, 2020

(65) Prior Publication Data
US 2022/0220741 A1    Jul. 14, 2022

(30) Foreign Application Priority Data
Apr. 16, 2019 (AU) .................. 2019901320

(51) Int. Cl.
*E04H 12/22* (2006.01)
*B66C 23/16* (2006.01)
(Continued)

(52) U.S. Cl.
CPC ....... *E04H 12/2269* (2013.01); *B66C 23/166* (2013.01); *E04C 3/02* (2013.01);
(Continued)

(58) Field of Classification Search
CPC ... B66C 23/166; E04H 12/22; E04H 12/2261; E04H 12/2269; E04H 12/2215; E04H 12/2253; F16M 2200/08
See application file for complete search history.

(56) References Cited

U.S. PATENT DOCUMENTS 6,471,176 B2 * 10/2002 Berthiaume ........ E04H 12/2269
                                                          248/529
6,685,154 B1 *  2/2004 Blyth ...................... E01F 9/696
                                                          248/512

(Continued)

FOREIGN PATENT DOCUMENTS

CA       2736718 A1 * 10/2011 ............. E04H 12/10
CN    106006409 A     10/2016
(Continued)

OTHER PUBLICATIONS

PCT International Search Report and Written Opinion; Application No. PCT/AU2020/000033, International filing date of Apr. 16, 2020, Australian Patent Office, dated Jun. 12, 2020, 8 pages.

*Primary Examiner* — Jessie T Fonseca
(74) *Attorney, Agent, or Firm* — Patent Law Works LLP

(57) ABSTRACT

A davit arm holder 30,50 for a davit arm 11-18 for suspending lines 4 from elevated heights by mounting the davit arm 11-18 on a structural substrate 1. The davit arm holder 30,50 comprises a base 50 formed from one or more planar layers 52 of sheet material adapted to lie parallel to the plane of a surface of the substrate 1, and an attachment 30 adapted to be fixedly attached to the base 50 and to provide a connection 32 to engage a davit arm 11-18. The base 50 includes an outer layer 52 and at least one inner mount 60. The outer layer 52 has a plurality of first engagement portions 70 that are radially spaced from a centre point 54 of the base 50. The at least one inner mount 60 is integrally formed with the outer layer 52, is fixedly securable to the substrate 1 and is
(Continued)

adapted to space an inside surface 68 of the outer layer 52 from the substrate 1 to form a gap 66 under the outer layer 52. The base 50 is adapted to have a low-profile when anchored to the substrate 1. The attachment 30 is adapted to be releasably engaged to the base 50 by a plurality of second engagement portions 40 adapted to engage the corresponding plurality of first engagement portions 70 by rotation of the attachment 30 about an axis 56 perpendicular to the plane of the substrate 1.

10 Claims, 4 Drawing Sheets

(51) Int. Cl.
    *E04C 3/02*           (2006.01)
    *E04C 3/30*           (2006.01)
    *F16M 11/22*        (2006.01)

(52) U.S. Cl.
    CPC ............... *E04C 3/30* (2013.01); *E04H 12/22* (2013.01); *E04H 12/2253* (2013.01); *E04H 12/2261* (2013.01); *F16M 11/22* (2013.01); *E04H 12/2215* (2013.01); *F16M 2200/066* (2013.01); *F16M 2200/08* (2013.01)

(56) References Cited

U.S. PATENT DOCUMENTS

| | | | |
|---|---|---|---|
| 8,117,798 | B2 | 2/2012 | Bergman |
| 9,630,816 | B1 | 4/2017 | Napieralski et al. |
| 11,142,436 | B1 * | 10/2021 | Napieralski ............ F16M 11/26 |
| 2002/0113190 | A1 | 8/2002 | Berthiaume |
| 2008/0184633 | A1 * | 8/2008 | Hamilton ................ E02D 27/42 |
| | | | 52/127.12 |
| 2009/0293410 | A1 | 12/2009 | Bergman |
| 2012/0324825 | A1 * | 12/2012 | Vrame ................ E04H 12/2253 |
| | | | 33/562 |
| 2013/0175422 | A1 | 7/2013 | Clarke et al. |
| 2016/0060889 | A1 * | 3/2016 | Tedesco ............. E04H 12/2238 |
| | | | 52/514 |
| 2018/0251996 | A1 * | 9/2018 | Roy .................... E04H 12/2284 |
| 2019/0236944 | A1 * | 8/2019 | Diekfuss ................ G08G 1/095 |
| 2022/0193470 | A1 * | 6/2022 | Voss ..................... G08B 21/182 |

FOREIGN PATENT DOCUMENTS

| | | | | |
|---|---|---|---|---|
| CN | 112922429 | A * | 6/2021 | ............ E02D 27/42 |
| DE | 19526927 | A1 | 1/1997 | |
| DE | 202018103518 | U1 * | 8/2018 | |
| EP | 1422458 | A1 | 5/2004 | |
| EP | 2269939 | A1 | 1/2011 | |
| KR | 20200001876 | U * | 8/2020 | |

* cited by examiner

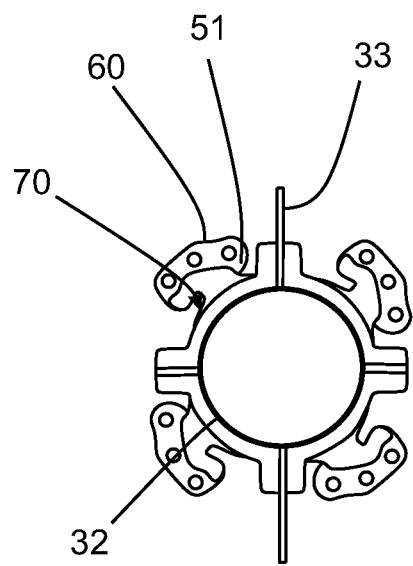
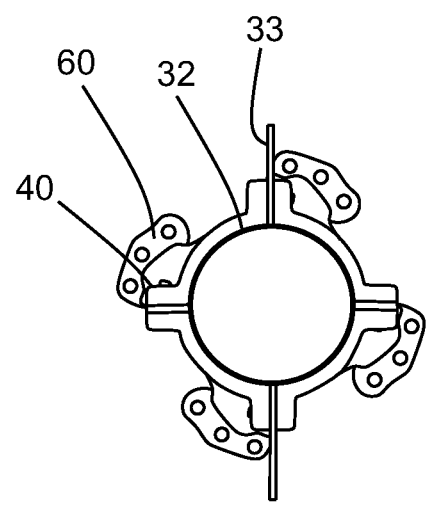
Fig. 5a  Fig. 5b
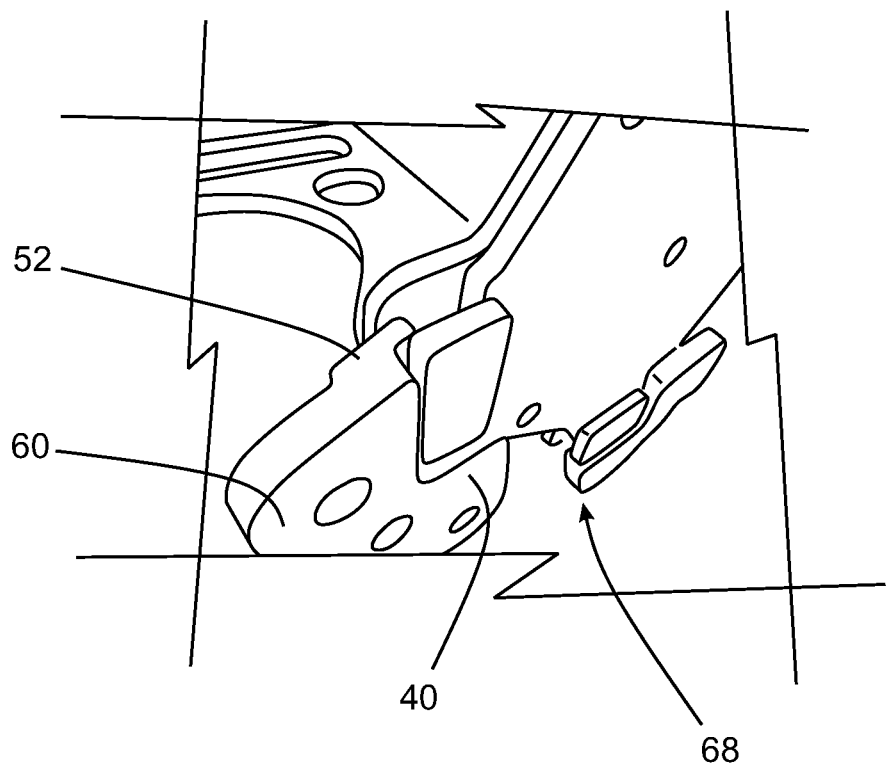
Fig. 6

DAVIT ARM BASE

CROSS-REFERENCE TO RELATED APPLICATIONS

This application is a national phase entry under 35 U.S.C. § 371 of International Patent Application PCT/AU2020/000033, filed Apr. 16, 2020, designating the U.S. of America and published in English as International Patent Publication WO 2020/210858 on Oct. 22, 2020, which claims the benefit under Article 8 of the Patent Cooperation Treaty to Australian Patent Application Serial No. 2019901320, filed Apr. 16, 2019, the entireties of which are hereby incorporated by reference.

FIELD OF INVENTION

This invention relates to a davit arm base. More particularly, this invention relates to a davit arm base for buildings. Still more particularly, this invention relates to a davit arm base for a davit arm for suspending a load from the side of a building.

BACKGROUND ART

The following references to and descriptions of prior proposals or products are not intended to be, and are not to be construed as, statements or admissions of common general knowledge in the art. In particular, the following prior art discussion should not be assumed to relate to what is commonly or well known by the person skilled in the art, but to assist in the inventive process undertaken by the inventor (s) and in the understanding of the invention.

Davits for buildings includes structural arms designed to suspend items over a structure's edge, for example over a ledge, wall, railing, balustrade, etc. The structure may be a building, ship, or other structure having a sheer vertical wall or structural features aligned in a vertical plane along which the item may be positioned. Davit arms may be used to suspend a window cleaner from the side of the building, with the cantilevered davit arm extending horizontally from a post and clearing a non-structural building feature, such as a balustrade. The davit arm may be removable. It may be temporarily fitted to the building via a socket that is fixed to the building.

Davit bases may be installed in open terraces and balconies. In such cases, it would be advantageous to ensure that the socket is recessed into the floor surface or slab at least to a level where its upper portions are flush with the floor surface and no portions protrude there above.

Recessing a base in a slab surface may need to be done when balcony concrete is poured. Otherwise, the floor material must be cored out to allow the base to be installed. Coring out a floor surface may be costly and may not be straightforward, particularly where the floor is made of concrete.

An object of the present invention is to ameliorate one or more of the aforementioned disadvantages of the prior art or to at least provide a useful alternative thereto.

STATEMENT OF INVENTION

The invention according to one or more aspects may be as defined in the independent claims. Some optional and/or preferred features of the invention are defined in the dependent claims.

Accordingly, in one aspect of the invention there is provided:

A davit arm holder for a davit arm for suspending lines from elevated heights by mounting the davit arm on a structural substrate, said davit arm holder comprising a base formed from one or more planar layers of sheet material adapted to lie parallel to the plane of a surface of the substrate material, and an attachment adapted to be fixedly attached to the base and to provide a connection to engage a davit arm, wherein:

A. the base comprises:
  a. an outer layer having a plurality of first engagement portions that are radially spaced from a centre point of the base; and
  b. at least one inner mount integrally formed with the outer layer, fixedly securable to the substrate and adapted to space an inside surface of the outer layer from the substrate to form a gap under the outer layer, whereby the base is adapted to have a low-profile when anchored to the substrate, B. the attachment is adapted to be releasably engaged to the base by a plurality of second engagement portions adapted to engage the corresponding plurality of first engagement portions by rotation of the attachment about an axis perpendicular to the plane.

Substrate

The structural substrate may be a structure presenting a substantially planar surface, such as a concrete slab, metal or wooden panel or proximal studs and the like. The substrate may be a wall or may have a horizontal surface or a surface inclined to the horizontal. The substrate may be a column or post. Preferably, the substrate is a floor. Preferably, the substrate comprises a concrete slab, which may be tiled or otherwise have a surface covering. Preferably, the substrate forms part of a roof, balcony, veranda or terrace of an elevated structure.

Base

The base is preferably fixed to the substrate. The low profile therefore enables the substrate to be used for other purposes when the davit arm is not installed without material interference of the base.

The outer layer may comprise a planar plate. The plate may be formed from a thick sheet of metal material, such as 6 mm steel plate. The outer layer may have a thickness extending the width of the sheet material.

The size of the gap may be defined by the thickness of the inner mount. The inner mount may be formed from the same sheet of material as the outer layer. The inner mount may be formed from a separate material to the outer layer. Preferably, the outer layer is welded or otherwise integrally formed with the inner mount.

The first engagement portions may be aligned tangentially in line with a nominal circle that is concentric with the centre point. The first engagement portions may be in the form of tangentially aligned slots. The slots may have inner side walls that follow an inner curve that has a general radius less than the nominal circle. The slots may have outer side walls that follow an outer curve that has a general radius greater than the nominal circle.

Attachment

The attachment has a connection that is adapted to releasably engage a davit arm. The connection may be in the form of a recess, channel or other female structure adapted to receive an end of a davit arm for engagement. The connection may comprise a socket. The socket may define a square or cylindrical recess. Preferably, the socket defines a cylindrical recess suitable to receive a cylindrical end of a davit arm. The davit arm may include a cylindrical sock that corresponds to the recess.

The attachment is not unintentionally removable from the base. A pin and aperture combination may be used to prevent inadvertent rotation of the attachment relative to the base.

The attachment is rotatable about the axis perpendicular to the plane of the substrate. Preferably, the rotation is about an axis coaxial with the centre point.

The second engagement portions may be in the form of protrusions. The protrusions may be in the form of toes or feet. The protrusions may have a footprint wider than the slots. The protrusions may have a footprint wider in a radial line from the centre point than the slots. Therefore, the protrusions may be adapted on engagement with the first engagement portions to be trapped under the outer layer in the gap.

Davit Arm

The davit arm comprises a lateral arm. If the base were to be wall mounted, the lateral arm may be received directly into the socket recess. The davit arm normally comprises a post and the lateral arm. the post is normally upright. The post may be adapted to be oriented substantially vertically. The lateral arm may extend substantially horizontally.

The lines may be suspended from a free and cantilevered end of the davit arm. The ines may be used to suspend workers at heights, such as window cleaners and other maintenance and repair workers working at heights on the sides of multiple story buildings.

BRIEF DESCRIPTION OF THE DRAWINGS

The invention may be better understood from the following non-limiting description of preferred embodiments, in which:

FIGS. 5a and 5b are top views of a davit arm holder in accordance with the embodiment shown in FIG. 1 in unengaged and engaged portions, respectively; and FIG. 6 is an underside perspective view of a first engagement portion engaged to a second engagement portion in accordance with the embodiment shown in FIG. 1.

DETAILED DESCRIPTION OF THE DRAWINGS

Figure 1:
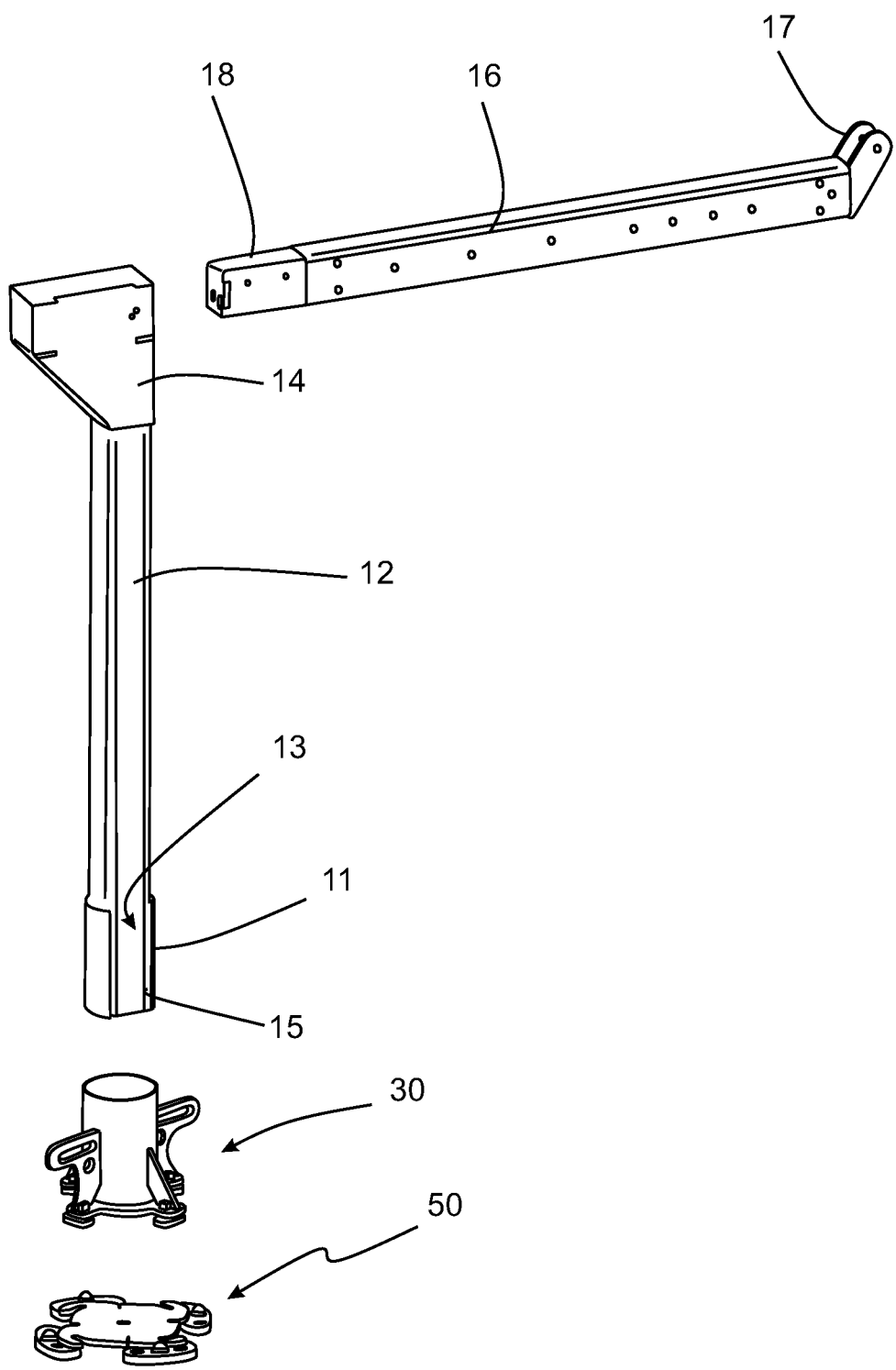
FIG. 1 is a perspective view of a davit arm mounted in a davit arm holder in accordance with an embodiment the invention.

Preferred features of the present invention will now be described with particular reference to the accompanying drawings. However, it is to be understood that the features illustrated in and described with reference to the drawings are not to be construed as limiting on the scope of the invention.

Referring to the drawings, there is shown a davit arm holder 30,50 for a davit arm 10 for suspending lines 4 from elevated heights by mounting the davit arm 10 on a structural substrate 1, said davit arm holder 30,50 comprising a base 50 formed from one or more planar layers of sheet material including a base plate 52, the planar layers adapted to lie parallel to a general plane P of a surface of the substrate 1, and an attachment 30 adapted to be fixedly attached to the base 50 and to provide a connection in the form of a cylindrical socket 32 to engage a davit arm 11-18. The base 50 includes an outer layer in the form of the base plate 52 and at least one inner mount in the form of a mounting flange 60. The inner mount is relationally inward relative to the innermost feature being the substrate 1, with the outer layer 52 further spaced away from the substrate 1.

The outer layer comprising the base plate 52 has a plurality of first engagement portions in the form of slots 70 that are radially spaced from a central region having a centre point 54 of the base 50. The slots are generally tangentially aligned on the periphery of, and are circumferentially spaced about, the base 50. The slots 70 all face in the same clockwise or anticlockwise direction and comprise a radially outer arm 70a that defines one inside face of an outer wall 70b of each slot 70. An inner wall 72 of each slot 70 is formed by the periphery of the base plate 52. The outer arm 70a terminates at an end 70c corresponding to a mouth of the slot 70 and in plan, overhangs radially inwardly in short cantilever manner over the outer wall inside surface 70b.

The at least one inner mounting flange 60 is integrally formed with the outer layer comprising the base plate 52. The flange 60 is fixedly securable to the substrate 1 and is adapted to space an inside or underside surface 68 of the base plate 52 from the substrate 1 to form a vertical gap 66 under the outer layer 52. The base 50 is adapted to have a low-profile when anchored to the substrate 1. The attachment 30 is adapted to be releasably engaged to the base 50 by a plurality of second engagement portions each including an outlying socket plate flange 38, a socket toe 40 and a smaller bridging portion 42. The socket toe 40 is a small flat plate having a footprint substantially corresponding to that of the corresponding socket plate flange 38. The bridging portion 42 is adapted to slide into a corresponding one of the slots 70. The second engagement portions 39,40,42 are adapted to engage the corresponding plurality of first engagement portions 70 by rotation of the attachment 30 about an axis 56 perpendicular to the plane of the substrate 1.

The attachment may be in the form of a removable socket 30. The base 50 advantageously has a low profile comprising the height of the mounting flange 60 (defining the vertical gap 66) and the thickness of the base plate 52. The base 50 is affixed to the building structure or substrate 1 by fasteners 62 such as bolts extending through apertures 64. The base 50 may have a substantially cross (x) shape in plan view, namely having a broad central disc in the form of the plate 52 and two pairs of diagonally opposed and circumferentially equi-spaced mounting flanges 60 extending beyond the general peripheral edge 75 of the central disc of the base plate 52. Similarly, in plan view, the attachment 30 is cruciform shaped and has a general central disc in the form of the socket plate 36 and two pairs of diagonally opposed socket plate flanges 38 extending beyond the general outer periphery 36a of the socket plate 36.

The upper removable socket 30 is adapted to engage the low profile base 50. A rotational movement in the clockwise direction R is required to lock the top socket attachment 30 to the base 50, whereby the socket toe 40 is adapted to slide passed the radially inner side 61 of the corresponding mounting flange 60, as the bridging portion 42 enters the corresponding slot 70 and an underside peripheral surface 31 of a socket plate 41 slides over the inner wall 72 and the radially outer arms 70a of the slots 70. The underside peripheral surface 31 corresponds to the socket plate flange 38 and in plan is super-imposed over the sock toe 40.

The socket toe 40 is, in plan view, generally trapezoidal and slightly wedge shaped, with its leading end having a narrower head portion 46 than the opposite tail-end thereof. The head portion 43 has rounded corners to facilitate entry of the socket toe 40 passed the leading corner of the outer wall inside face 70b.

The base 50 is of a height and geometry that allows it to sit under and between most commercial paver systems used on terrace substrates 2 of high rise buildings.

Figure 4:
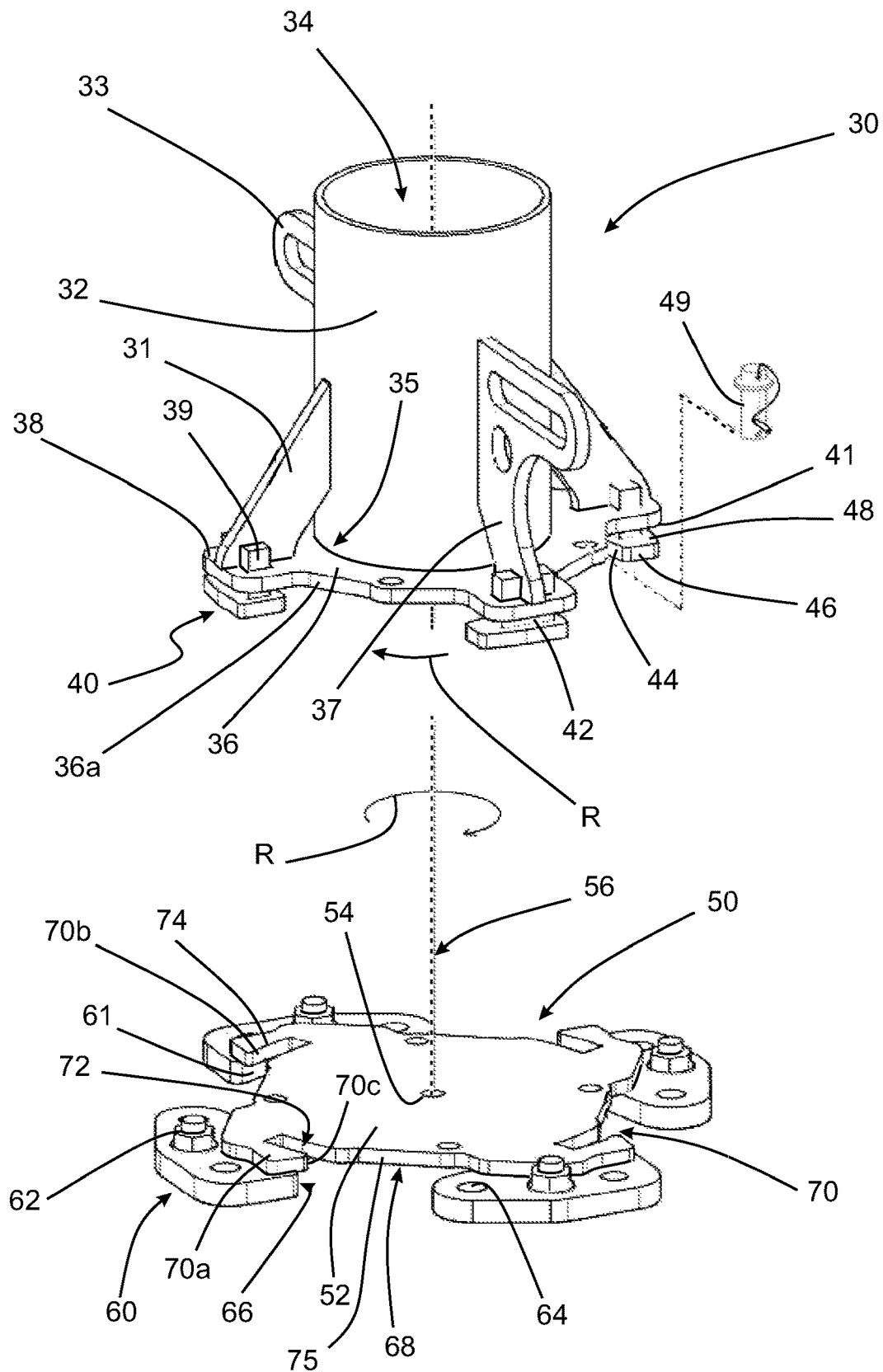
FIG. 4 is an exploded perspective view of a davit arm holder in accordance with the embodiment shown in FIG. 1.

As shown in FIG. 4, the attachment 30 is placed over the base 50 so that the socket plate 36 is superimposed over the base plate 52 and parallel-planar thereto. The socket toes 40 are respectively positioned anti-clockwise of the corresponding mounting flange 60 as shown in FIG. 5a, and the attachment 30 is then rotated clockwise in direction R to engage the socket toes 40 in the grooves or slots 70 as shown in FIG. 5b. Each toe 40 has a corresponding slot 70 adapted to receive the bridging portion 42 of the toe 40.

A view from underneath the base 50 is shown in FIG. 6. The toe 40 is engaged to secure the assembly 30,50 together.

A pin 49 (including a cotter pin) or similar, is used to secure the two parts, the attachment 30 and the base 50, from unintentionally rotating in a reverse direction to R and disengaging.

Figures 2, 3:
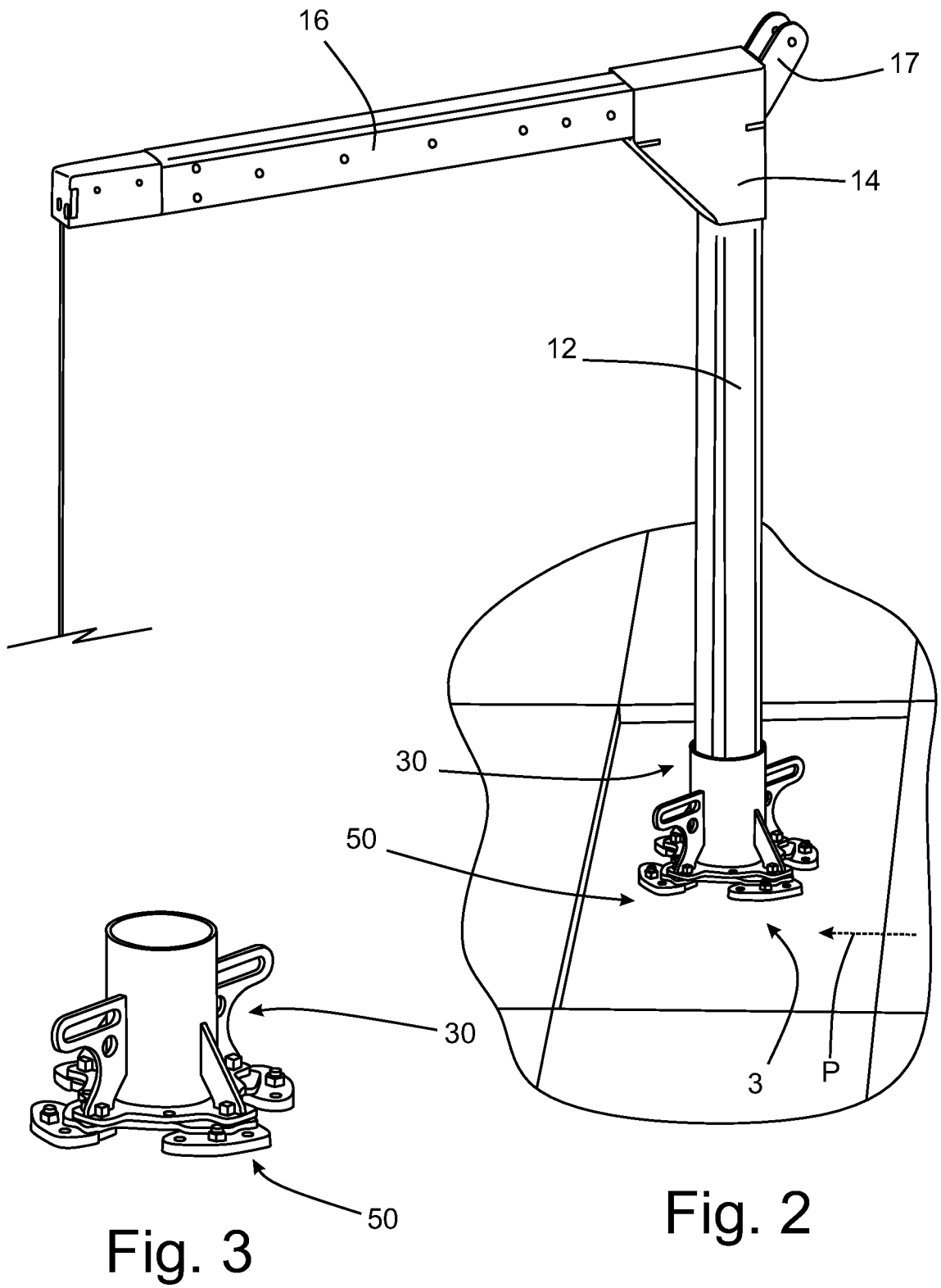
FIG. 2 is a perspective view of a davit arm holder in accordance with the embodiment shown in FIG. 1.
FIG. 3 is an exploded perspective view of a davit arm and davit arm holder in accordance with the embodiment shown in FIG. 1.

The removable socket attachment 30, when secured to the base 50, is shown in FIG. 3.

The davit arm assembly 10 is then installed into a recess 34 defined by a cylinder 32 of the attachment 30.

In terms of advantages, the preferred embodiment provides that:
  The base (in terms of manufacturing and supply to market, the high volume part) is greatly simplified, being constructed of only a flat plate 52 integrally formed with flat mounting flanges 60.
  The base 50 may be easily affixed with bolt 62 style fittings. This eliminates the prior art need to completely recess a socket into a slab substrate 1 by excavation of the concrete.
  The cross (x) configuration of the base 50 allows it to sit neatly under or in between pod or paver 2 systems.
  The rotational lock mechanism 40,70 allows for a compact and low-profile system of attachment, allowing the base 50 to be fitted by lifting one paver or tile 2 of the substrate 1 only.
  The rotational locking arrangement between protrusions 40 and recesses 70 offers a highly secure load transfer between the socket attachment 30 and the base 50.

Turning in more detail to the drawings, FIG. 1 shows the davit arm 10 arrangement of one embodiment in its entirety. The davit arm 10 comprises a substantially vertical post 12 made from square section tubing that has a partial cylindrical sleeve 11 adapted to be received in the corresponding cylindrical recess 34 so that the lateral arm 16 may be permitted to swivel through a limited arc defined by a detent in the cylinder 32 that coacts with the gap 13 between the side edges 15 of the partial cylindrical sleeve 11. The upper end of the post 12 is fitted with an elbow 14 enabling the lateral arm 16 to be fitted thereto. The lateral arm 16 comprises a leading cantilevered end with the telescoping extension 18 to which the lines may be attached and its mounted end includes a detent 17. Accordingly, the lateral arm 16 may be fed through a through hole in the elbow 4 and trapped in place by the detent 17 as shown in FIG. 2.

The base 50 is shown in FIGS. 4-6 to comprise an outer layer in the form of the base plate 52 that is cut or cast to define a series of tangentially aligned peripheral slots 70 arranged to be radially spaced from the centre point 54 and circumferentially spaced around a nominal circle 51.

The slots 70 may number 2-4 or more. Four slots 70 are preferred and this enables the plan or footprint of the base 50 to be generally cross shaped and to sit neatly in a square shaped cavity 3 that may be vacated by removing a paver or tile 2 preparatory to installation of the base 50.

The inside wall 44 of the toe 40 may have a substantially identical radius compared to the outer toe wall 48, or may be marginally smaller. Alternatively, where the slot is short in length (for example, about as long as it is wide), the inside and outer walls 44,48 may define a linear slot and be substantially parallel.

The gap 66 may be defined by the height of the inner mounting flanges 60. These are "inner" in the sense that they are closest to the substrate 1 and the plate 52 thereby represents an outer layer of the base 50.

The mouths of the slots 70 face anticlockwise toward an approaching leading toe edge 46 in the engagement process. Each toe 40 depends from the underside 68 of the plate 52 by a bridge 42, being a thin portion connecting the toe 40 to the plate 52 and being dimensioned to slide into and be retained in the slot 70. The toe 70 has a wider lateral or radial (relative to the axis 54) footprint than the width of the slot 70 so that engagement of the toe 40 in the slot traps the foot against axial displacement relative to the plate 52.

The inner mounting flanges 60 may be welded to the periphery of the underside 68 of the plate 52 and present apertures 64 for reception of bolts 62 to enable the base 50 to be anchored permanently to a substrate 1 by engaging corresponding apertures formed in the substrate 1. Multiple apertures 64 are provided and not all will be used to engage with the substrate depending on the expected load on the davit arm 10.

Lateral diagonally and radially extending brace arms 31 strengthen the structure of the attachment 30 with regard to the join 35 between the cylindrical socket 32 an the socket plate 36 as the momentary forces applied by the davit arm 10 at the join 35 can be significant. Diametrically opposed brace arms 37 are unitarily formed with a pair of handles 33 that assist in manipulation to engage or disengage the attachment 30 from the base 50. The base of the brace arms 31,37 is fixed to radial flange extensions 38 of the socket plate 36 that, in plan, are superimposed over the respective toes 40. As seen in FIG. 6, the radially inner side 61 of the mounting flange 60 defines an end wall at the clockwise end beyond the closed end of the slot 70 to limit extent of translation of the toe 40 and the clockwise rotation of the attachment 30 relative to the base 50.

Welded blocks 39 located on the peripheral flange extensions 38 either side of each base of each brace arm 31,37 further stabilise the structure.

The base 50 achieves a low profile, being formed of one outer layer 52 in turn formed from a sheet of metal material (eg. 3-4 mm thick), and the inner mounting flange 60 layer formed of a thicker plate material (eg. 5-6 mm thick), so that the entire height of the base 50 comprises in effect only two layers of sheet material.

| Ref | Description | Ref | Description |
| --- | --- | --- | --- |
| 1 | substrate | 30 | davit arm attachment |
| 2 | paver or tile | 31 | reinforcing brace arm |
| 3 | cavity | 32 | socket cylinder |
| 4 | lines | 33 | handle |
| 10 | davit arm | 34 | recess |

-continued

| Ref | Description | Ref | Description |
|---|---|---|---|
| 11 | partial cylindrical sleeve | 35 | join between cylinder and socket plate |
| 12 | davit post | 36 | socket plate |
| 13 | gap | 36a | outer periphery of socket plate |
| 14 | davit elbow | 37 | brace arm with handle |
| 15 | side edges | 38 | socket plate flange |
| 16 | lateral arm | 39 | reinforcing blocks |
| 17 | detent | 40 | socket toe |
| 18 | telescopic extension to davit arm | 41 | underside peripheral surface of socket plate 36 |
| 50 | base | 42 | toe bridge |
| 51 | nominal circle | 44 | inside wall of toe |
| 52 | base plate | 46 | leading edge of toe |
| 54 | centre point | 48 | outer wall of toe |
| 56 | rotational axis | 49 | pin including cotter pin |
| 61 | radially inner side of mounting flange | | |
| 70 | first engagement slots | 60 | inner mounting flange |
| 70a | outer arm | 62 | fasteners |
| 70b | outer wall inside surface | 64 | apertures |
| 70c | terminal end of outer arm | 66 | gap |
| 72 | inner wall of slots | 68 | underside surface of base plate |
| 74 | outer wall of slots | R | direction of rotation to engage attachment 30 to base 50 |
| 75 | peripheral edge of base plate | P | Plane of substrate surface |

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

In the present specification, terms such as "apparatus", "means", "device" and "member" may refer to singular or plural items and are terms intended to refer to a set of properties, functions or characteristics performed by one or more items or components having one or more parts. It is envisaged that where an "apparatus", "means", "device" or "member" or similar term is described as being a unitary object, then a functionally equivalent object having multiple components is considered to fall within the scope of the term, and similarly, where an "apparatus", "assembly", "means", "device" or "member" is described as having multiple components, a functionally equivalent but unitary object is also considered to fall within the scope of the term, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the lateral arm uppermost. In describing the mounting flanges 60 as "inner" and the base plate 52 as an "outer" layer, this is in relation to the substrate 1 being the innermost feature, with the davit arm 10 extending outwardly therefrom. Thus, where the base 50 is mounted to a horizontal substrate 1, the inner mount 60 may be a lower mount, and the outer layer 50 may be an upper layer. Although the rotation and orientation of the attachment 30 relative to the base 50 has been described with reference to the terms clockwise and anti-clockwise, the skilled reader with understand that the orientation or directions may be complementarily reversed to a functionally equivalent mirror image arrangement.

It will be appreciated by those skilled in the art that many modifications and variations may be made to the methods of the invention described herein without departing from the spirit and scope of the invention.

The invention claimed is:

1. A davit arm holder for a davit arm for suspending lines from elevated heights by mounting the davit arm on a structural substrate, said davit arm holder comprising a base formed from one or more planar layers of sheet material adapted to lie parallel to a plane of a surface of the substrate, and an attachment adapted to be fixedly attached to the base and to provide a connection to engage a davit arm,
wherein:
A. the base comprises:
a. an outer layer having a plurality of first engagement portions that are radially spaced from a central region of the base; and
b. at least one mount integrally formed with the outer layer, fixedly securable to the substrate and adapted to space an inside surface of the outer layer from the substrate to form a gap under the outer layer, whereby the base is adapted to have a low-profile limited to the thickness of the outer layer and the size of the gap when anchored to the substrate; and
B. the attachment is adapted to be releasably engaged to the base by a plurality of second engagement portions adapted to engage the corresponding plurality of first engagement portions by rotation of the attachment about an axis perpendicular to the plane.

2. The davit arm holder of claim 1, wherein the outer layer is in the form of a planar plate and the size of the gap corresponds to the thickness of the at least one mount.

3. The davit arm holder of claim 1, wherein the first engagement portions are aligned tangentially in line with a nominal circle that is concentric with a center point of the central region.

4. The davit arm holder of claim 3, wherein the first engagement portions are in the form of tangentially aligned slots.

5. The davit arm holder of claim 4, wherein the slots are defined by:
inner side walls that follow an inner curve that has a general radius less than the nominal circle; and
outer side walls that follow an outer curve that has a general radius greater than the nominal circle.

6. The davit arm holder of claim 4, wherein the second engagement portions are in the form of toes that each have a footprint wider than the corresponding slot or each of the toes has a footprint wider in a radial line from the center point than the corresponding slots, such that each toe is adapted, on engagement with the first engagement portions, to be trapped by the outer layer in the gap.

7. The davit arm holder of claim 4, wherein the outer layer is in the form of a base plate adapted to lie parallel to the plane of the surface of the substrate, the slots all face in the same clockwise or anticlockwise direction and comprise a radially outer arm that defines one inside face of an outer wall of each of the slots.

8. The davit arm holder of claim 7, wherein the at least one mount is in the form of a flange that is fixedly securable to the substrate and is adapted to space an inside or underside surface of the base plate from the substrate to form the gap under the outer layer.

9. The davit arm holder of claim 7, wherein each of the plurality of second engagement portions each include an outlying socket plate flange, from which depends a bridging portion supporting a protrusion.

10. The davit arm holder of claim 9, wherein the protrusion is in the form of a foot or toe and the bridging portion is adapted to enter and be engageably retained in the corresponding slot.

* * * * *